US009117563B2

(12) United States Patent
Hughes et al.

(10) Patent No.: US 9,117,563 B2
(45) Date of Patent: Aug. 25, 2015

(54) ULTRA-COLD-MATTER SYSTEM WITH THERMALLY-ISOLATED NESTED SOURCE CELL

(71) Applicants: Steven Michael Hughes, Louisville, CO (US); Janet Duggan, Boulder, CO (US); Dana Z. Anderson, Boulder, CO (US)

(72) Inventors: Steven Michael Hughes, Louisville, CO (US); Janet Duggan, Boulder, CO (US); Dana Z. Anderson, Boulder, CO (US)

(73) Assignee: Cold Quanta, Inc., Boulder, CO (US)

( * ) Notice: Subject to any disclaimer, the term of this patent is extended or adjusted under 35 U.S.C. 154(b) by 0 days.

(21) Appl. No.: 14/594,111

(22) Filed: Jan. 10, 2015

(65) Prior Publication Data

US 2015/0200029 A1 Jul. 16, 2015

Related U.S. Application Data

(60) Provisional application No. 61/926,592, filed on Jan. 13, 2014.

(51) Int. Cl.

| | |
|---|---|
| ***H05H 3/02*** | (2006.01) |
| ***H05H 3/00*** | (2006.01) |
| ***H01S 1/00*** | (2006.01) |
| ***H01S 3/00*** | (2006.01) |
| ***G21K 1/00*** | (2006.01) |

(52) U.S. Cl.
CPC .................................... *G21K 1/006* (2013.01)

(58) Field of Classification Search
USPC .......... 250/251, 428, 423 R, 430, 432 R, 436, 250/526
See application file for complete search history.

(56) References Cited

U.S. PATENT DOCUMENTS

| | | | | |
|---|---|---|---|---|
| 2,993,638 | A | 7/1961 | Hall | |
| 3,398,879 | A | 8/1968 | James et al. | |
| 3,579,998 | A * | 5/1971 | Thibault et al. | 62/55.5 |
| 3,755,704 | A | 8/1973 | Spindt et al. | |
| 3,797,264 | A * | 3/1974 | Thibault et al. | 62/55.5 |
| 5,256,995 | A | 10/1993 | Scholes | |
| 6,004,104 | A | 12/1999 | Rutherford | |
| 6,293,106 | B1 * | 9/2001 | Acharya et al. | 62/3.1 |
| 7,126,112 | B2 * | 10/2006 | Anderson et al. | 250/251 |

(Continued)

FOREIGN PATENT DOCUMENTS

| | | | |
|---|---|---|---|
| EP | 0106377 | B1 | 11/1988 |
| EP | 1267385 | A1 | 12/2002 |

(Continued)

OTHER PUBLICATIONS

U.S. Appl. No. 14/466,711, Hughes, Steven M.

(Continued)

*Primary Examiner* — Bernard E Souw
(74) *Attorney, Agent, or Firm* — Clifton Leon Anderson

(57) ABSTRACT

In a disclosed embodiment, an ultra-cold-matter (UCM) system includes a source cell nested within a hermetically-sealed ultra-high-vacuum (UHV) enclosure. Source particles, e.g., strontium atoms, can be generated within the source cell by heating a non-vapor-phase source material. The source cell is thermally isolated, e.g., by UHV, from the enclosure. Accordingly, heat is retained in the source cell, reducing the amount of heat that must be generated in the source cell to generate the vapor-phase source particles. Particles can exit the source cell to an UHV ultra-cold region where the source particles can be cooled to produce ultra-cold particles thermally isolated from the heat within the source cell.

16 Claims, 11 Drawing Sheets

(56) References Cited

U.S. PATENT DOCUMENTS

| | | | | |
|---|---|---|---|---|
| 7,470,971 | B2 | 12/2008 | McBride | |
| 7,494,326 | B2 | 2/2009 | Bonne | |
| 7,807,509 | B2 | 10/2010 | McBride | |
| 7,811,421 | B2 | 10/2010 | Chistyakov | |
| 7,955,551 | B2 | 6/2011 | McBride et al. | |
| 8,405,021 | B2 * | 3/2013 | Anderson et al. | 250/251 |
| 8,415,612 | B2 * | 4/2013 | McBride et al. | 250/251 |
| 8,439,649 | B2 | 5/2013 | Rutherford et al. | |
| 2002/0185947 | A1 | 12/2002 | Schulte et al. | |
| 2010/0207016 | A1 * | 8/2010 | McBride et al. | 250/251 |
| 2012/0039689 | A1 | 2/2012 | Touchberry et al. | |
| 2012/0258022 | A1 * | 10/2012 | Hughes et al. | 422/291 |

FOREIGN PATENT DOCUMENTS

| | | | |
|---|---|---|---|
| EP | 1733414 | B1 | 12/2006 |
| EP | 2151849 | B1 | 2/2010 |
| EP | 2154585 | B1 | 2/2010 |

OTHER PUBLICATIONS

U.S. Appl. No. 14/538,568, Hughes, Steven M.

P. Cheiney et. al., "A Zeeman slower design with permanent magnets in a Halbach configuration", Review of Scientific Instruments, 82, 2011.

S. Rutherford, "Miniature Sputter-Ion Pump Design Considerations," NASA/JPL, pp. 1-15, 1999.

J. Z. W. G. Marcin Bober, "Designing Zeeman slower for strontium atoms—towards optical atomic clock," arxiv, 2010.

K.W. Ormond, Design of a Vacuum System for a Compact, High Luminosity CESR Upgrade, Cornell University, 2001.

S.a.Y.B. Gianchandani, "Miniature Penning Cell Array for On-Chip Vacuum Pumping," Ann Arbor, Michigan.

* cited by examiner

ULTRA-COLD-MATTER SYSTEM WITH THERMALLY-ISOLATED NESTED SOURCE CELL

This application claims priority based on U.S. Provisional Patent Application 61/926,592, filed 2014 Jan. 11.

BACKGROUND

The sensations of hot and cold that humans experience are associated, on an atomic level, with "Brownian" molecular motion. Hotter temperatures are associated with more motion, while cooler temperatures are associated with less motion. "Absolute zero", i.e., zero Kelvin (0 K), is associated with zero molecular motion.

With the development of laser cooling and other cold-atom technologies for controlling the motion of individual atoms, ultra-cold temperatures (below 1 K) have been achieved. Atoms in a vapor phase become ultra-cold as they are slowed, e.g., through the use of laser cooling. Among the practical applications is the development of more precise atomic clocks. Basic science has been advanced by the discovery of new techniques for manipulating atoms and discoveries of new states of matter, e.g., Bose-Einstein condensates.

To maintain an atom in an ultra-cold state, collisions with other atoms must be avoided. Collisions between atoms are most easily avoided when there are very few atoms to collide with each other. Therefore, cold-atom systems maintain their ultra-cold atoms in an ultra-high vacuum (UHV), i.e., at less than $10^{-9}$ torr.

In practice, a UHV requires a hermetically-sealed environment designed to prevent the entry and exit of atoms. Accordingly, it is preferable to generate the vapor-phase atoms within the vacuum environment rather than to introduce them from outside the vacuum environment. Vapor-phase atoms can be generated within a vacuum environment by heating a liquid or solid phase material including the atoms of interest. Heat required for the phase conversion can result from converting electrical energy introduced to the vacuum environment via feedthroughs, from converting optical energy introduced through transparent walls of the vacuum enclosure, or other means. However, while some species provide sufficient vapor pressure at room temperature for these applications, other species or atoms require temperatures in excess of several hundred degrees Celsius (° C.). To get a reservoir of atoms to this temperature requires increasing amounts of power to overcome cooling mechanisms such as convection over the cell body, or blackbody radiation. What is needed is an approach to dealing with problems associated with the generation of heat within a cold-atom system.

DETAILED DESCRIPTION

In the course of the present invention, it was discovered that heat management is increasingly a concern for ultra-cold-matter (UCM) systems. There is increasing interest in strontium and other source materials that require high temperatures for production of a vapor phase. In addition, there is a trend toward more compact UCM systems that reduce the spatial separation between the high temperatures and an ultra-cold region. Thus, it is becoming more challenging to prevent the heat used to generate vapor-phase source atoms from compromising temperatures in the ultra-cold region of a UCM system, consuming tight power budgets, or causing thermal induced failures in the system.

The present invention addresses this heat related problem using a source cell that is nested within and thermally isolated from a vacuum enclosure. As a result of the thermal isolation, less of the heat generated within the source cell escapes from the source cell. This means that the amount of heat that must be introduced to maintain desired temperatures within the source cell can be reduced. This, in turn, reduces the amount of heat to be managed. Since less heat is generated and since less of the generated heat escapes the source cell, the exposure of the ultra-cold region to heat is greatly reduced. Thus, the thermally-isolated nested source cell provides for more compact low-power ultra-cold-matter systems and for the use of a greater variety of source materials.

Figure 1:
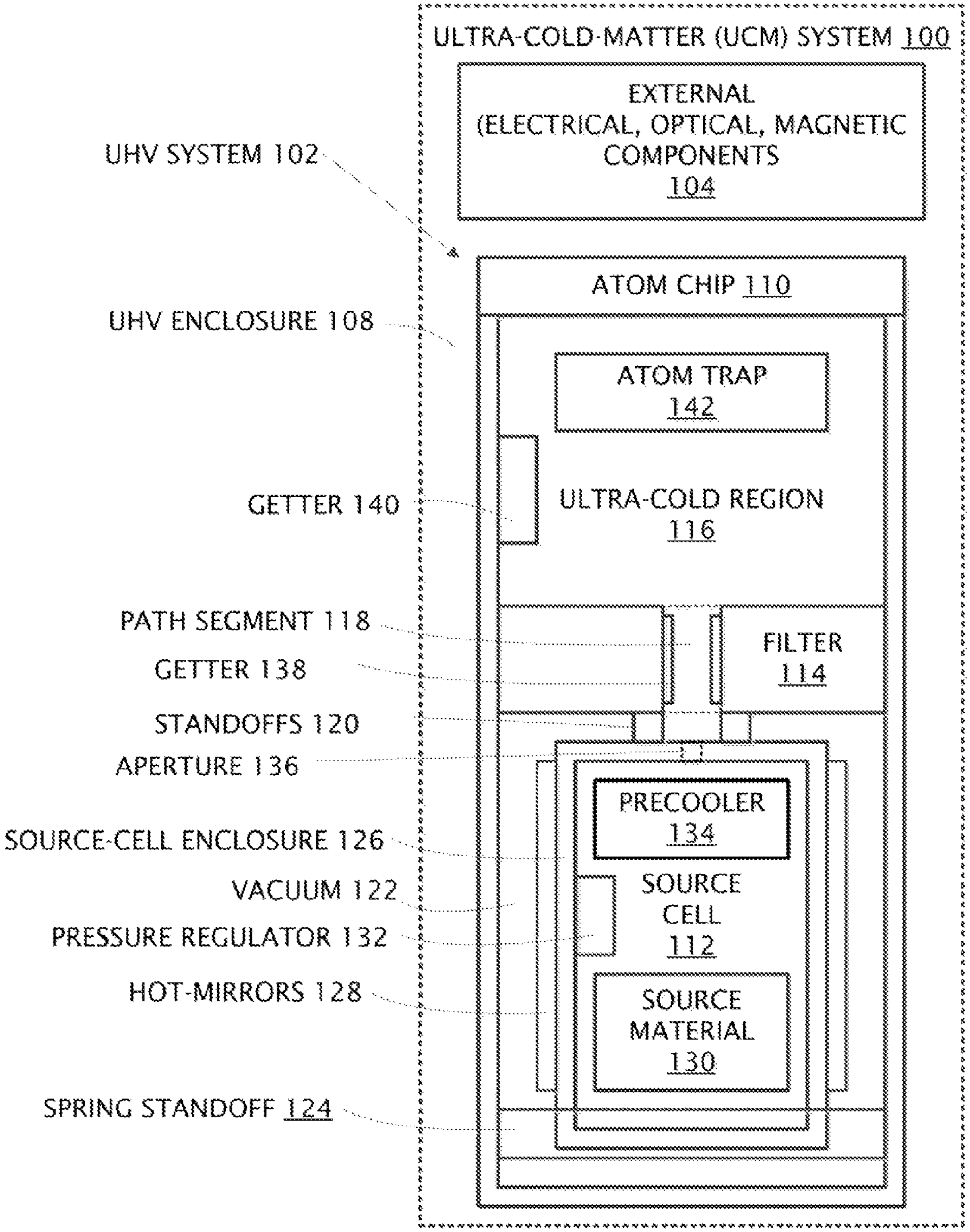
FIG. 1 is a schematic diagram of an ultra-cold-matter (UCM) system in accordance with the invention.

In accordance with the invention, an ultra-cold-matter (UCM) system 100, shown in FIG. 1, includes a hermetically-sealed ultra-high-vacuum (UHV) system 102 as well as external (electrical, optical, and magnetic) components 104. Electrical components can be used for resistively heating the source cell and/or its contents. The optical components can include lasers to guide, trap, and cool atoms via optical molasses. Alternatively, optical components can cooperate with magnetic components to form magneto-optical traps (MOTs) to guide, trap, and cool atoms. In alternative embodiments, optical components can be used with or without optical elements within a UHV system.

UHV system 102 includes a hermetically-sealed or sealable enclosure 108 that defines boundaries for a UHV environment. As illustrated, UHV enclosure 108 has a rectangular parallelepiped shape that is elongated in a direction separating square ends. One of the square ends is sealed by an atom chip 110, such as the atom chip disclosed in U.S. Patent Publication U.S. Pat. No. 7,126,112 B2. The atom chip can include conductive vias that allow electrical communications between the interior and the exterior of UHV system 102. The other five walls of the enclosure are of Pyrex®, a sodium borosilicate glass manufactured by Corning, Inc. Alternative embodiments use other geometries, components, and materials for the enclosure.

UHV enclosure 108 contains a source cell 112, a collimating filter 114, and an ultra-cold region 116. Filter 114 separates source cell 112 and an ultra-cold region 116, while providing a particle conductance path segment 118 to trap off-axis atoms, including thermal atoms, leaving predominantly collimated (on-axis) pre-cooled atoms to pass from source cell 112 to ultra-cold region 116. Filter 114 can also act as a heat sink to further minimize heat transfer from source cell 112 to ultra-cold region 116. An alternative embodiment omits the separator between the source cell and the cold region. UHV enclosure 108 is formed of transparent glass. In an alternative embodiment, a non-transparent enclosure includes one or more transparent windows for optical access.

Source cell 112 is indirectly attached to UHV enclosure 108 via filter 114. Source cell 112 is attached to filter 114 via low-thermal conductivity standoffs 120. Source cell 112, so attached, is separated from UHV enclosure 108 by vacuum 122, which provides thermal isolation of source cell 112 from UHV enclosure 108. Like UHV enclosure 108, source cell 112 is formed of material transparent to visible or near-infrared light produced by a laser of external components 104. In an alternative embodiment, a non-transparent source cell includes at least one transparent window for optical access to the interior of the source cell, e.g., for pre-cooling atoms using a two-dimensional MOT.

Figure 2A:
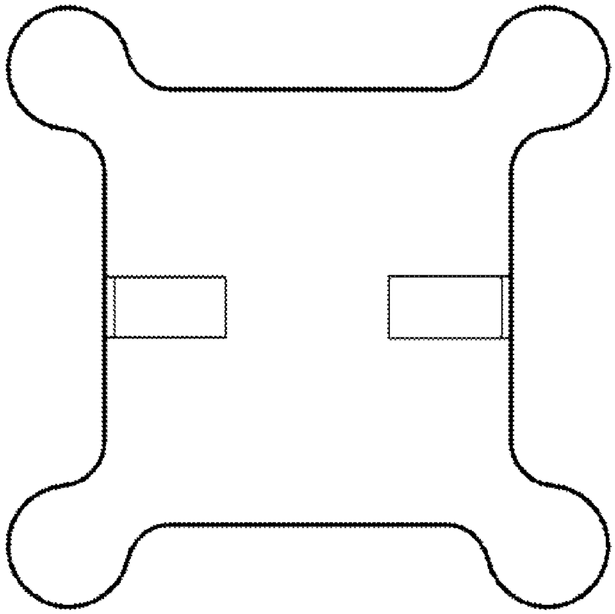
FIGS. 2A-2B are top and perspective views, respectively, of a spring used in spatially and thermally isolating a source cell from a vacuum enclosure of the UCM system of FIG. 1.
Figure 2B:
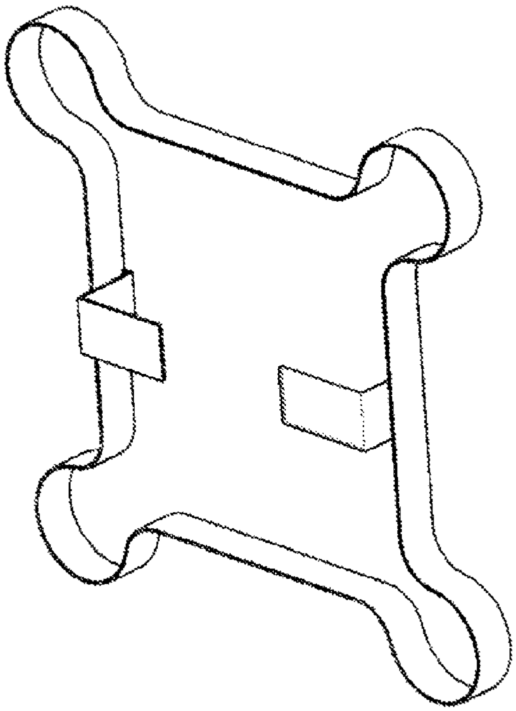

Spring standoff 124, shown in FIGS. 2A and 2B, provides a restoring force to maintain an end of source cell 112 distal from filter 114 in alignment to reduce stress on standoffs 120. Source cell 112 includes a source enclosure 126 that separates an interior of source cell 112 from its exterior. A dichroic coating on external surfaces of source enclosure 126 can be used as a hot mirror 128 to reflect infra-red light escaping source cell 112 back into its interior while allowing light, e.g., visible or near-infrared light, to transmit through source enclosure 126.

Source cell 112 includes a stock of non-vapor-phase source material 130. Source material 130 may be in liquid or solid form, in elemental, compound, or other form. Source cell 112 includes a pressure regulator 132 in the form of getter material for sorbing (adsorbing or absorbing) and releasing vapor-phase source particles. UCM system 100 further defines a pre-cooler 134 in source cell 112. Pre-cooler 134 can involve optical and/or magnetic components of external components 104. In addition, pre-cooler can include optical elements within source cell 112, e.g., to redirect incident laser beams.

The laser beams not only pre-cool source atoms, but also push pre-cooled source atoms through an exit aperture 136 of source cell 112. Atoms exiting source cell 112 through aperture 136 enter path segment 118 of filter 114. Thermal and other off-axis atoms can hit and be trapped by a getter material 138 that coats walls or is suspended just off of the walls of path segment 118. This leaves predominantly on-axis pre-cooled atoms to enter ultra-cold region 116. Ultra-cold region 116 can include a getter 140 to trap thermal atoms that make it through filter 114. The getter materials for getters 138 and 140 can be gold, carbon, or antimony, depending on the moiety of the source atoms.

At least 50%, and preferably well over 90%, of the external surface area of source cell 112 is separated from the inner wall of vacuum enclosure 108 by vacuum or other thermal insulator. The result is that heat dissipated within source cell 112 is substantially retained within source cell 112, reducing the need for additional heat to maintain temperatures internal to the source cell. The effectiveness of the thermal isolation is enhanced using collimating filter 114 as a heat sink. Thermal isolation can be further increased using one or more hot mirrors disposed on at least one of an outer surface of the source cell and an inner surface of the UHV cell wall to reflect heat (in the form of infrared light) escaping from source cell 112 back into source cell 112. As a result, more compact UCM systems and more heat-intensive source materials can be used.

Because source cell 112 is substantially separated from external (to source cell 112) structural components of UHV system 102, it is freed from some of the constraints that apply to materials of other components. For example, since atom chip 110 and collimating filter 114 are formed largely of silicon, then the material of UHV enclosure 108 must be compatible, e.g., there must be a suitable method of bonding the enclosure material to the silicon and the coefficients of thermal expansion must be sufficiently matched over operational temperature range. However, the material of source cell 112 need not be CTE matched, nor need there be a method of bonding the source-cell material to other materials as the standoffs 124 can be designed with a slot arrangement that accommodates differential thermal expansion.

The relaxing of the compatibility constraints allows other properties to be optimized for other purposes. For example, demand for use of strontium as a source material has been increasing. However, strontium is highly reactive and, so, is typically provided in a non-vapor form, e.g., as a pure metal or alloy. Conversion of the source material to release strontium vapor requires a relatively high temperature. Hot and highly reactive strontium vapor can corrode glass, silicon, and metal and other materials often used in a UHV environment. However, the source-cell enclosure can be made of sapphire or high-alumina content glass to resist the corrosion, even though the source-cell enclosure material is not CTE matched or easily bonded to other UHV cell materials.

Note that the principle of operation of the thermally insulated nested source cell is not unlike that used by a thermos to keep contents hot. However, instead of being used mainly to maintain the temperature of its contents, the nested source cell reduces the amount of heat that must be input to maintain a temperature and isolates the cold region from the heat associated with the source cell.

Thus, the present invention provides for practical fabrication of cold and ultra-cold vacuum systems for atomic or chemical species requiring specialized containment such as sapphire barriers, while leveraging conventional vacuum chamber technologies that rely on glass, ceramic, or metals, which would otherwise be incompatible with the vapor species contained therein. This invention provides UCM systems that utilize an alkali or alkaline metal such as strontium, which at high temperatures is corrosive to conventional materials including Pyrex® and steel. The cell-within-a-cell topology allows an inner containment cell of a material such as sapphire, which is resistant to hot strontium, to be suspended within an outer hermetic-vacuum chamber made of glass, silicon, or metal. This suspended source cell configuration reduces thermal power requirements as the thermos-like-geometry allows the inner cell to hold high temperatures in the hundreds of degrees centigrade while the outer cell is nominally a fraction of that above room temperature. This nested cell technology allows for substantial size reduction and deployability of vacuum chambers with caustic or high-temperature species. The nested-cell technology has applications in atomic clocks, frequency references, inertial navigation, gravimetry, magnetometry, and quantum computing.

Figure 3:
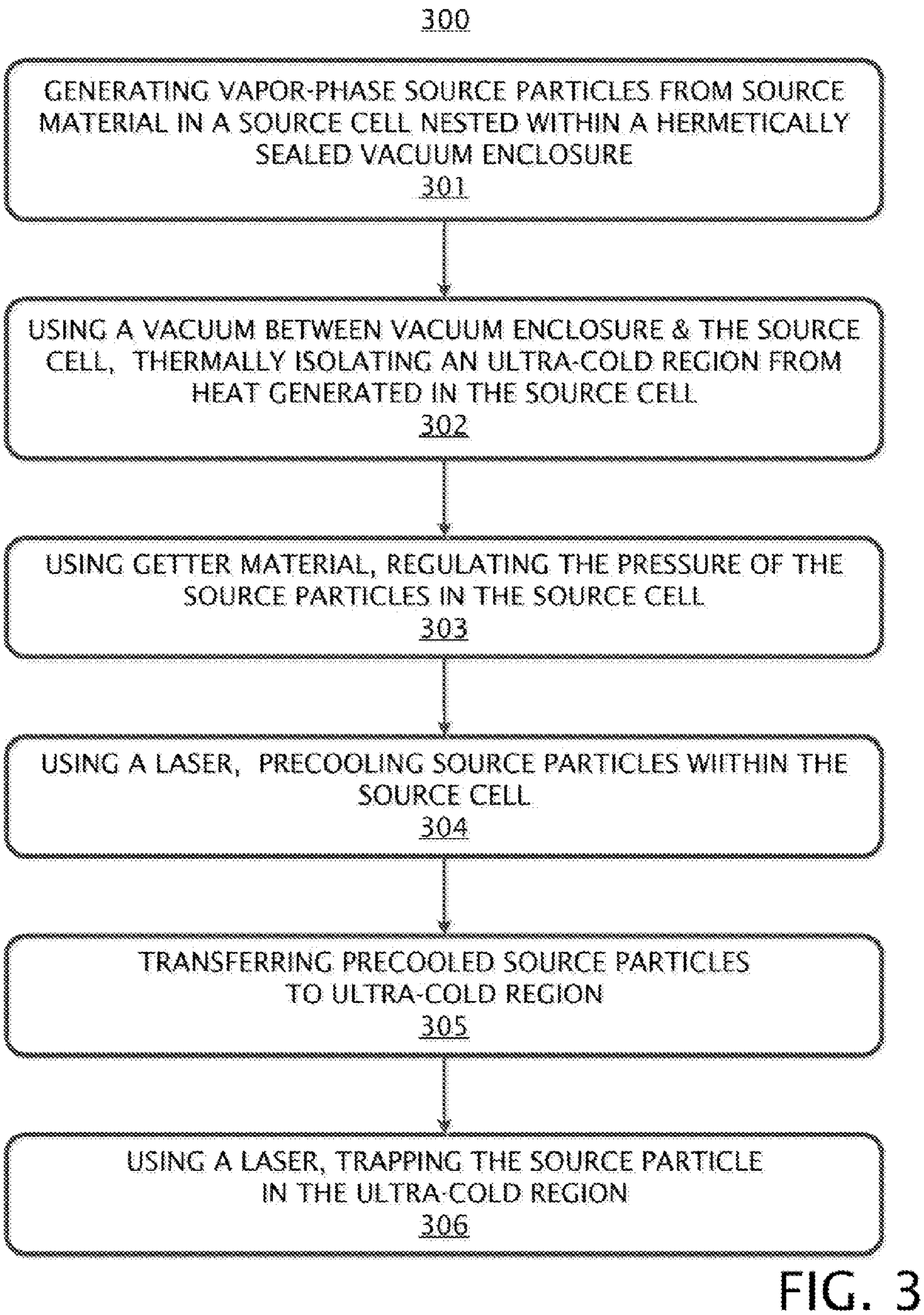
FIG. 3 is a flow chart of a process for using a UCM to trap source particles.

A process 300, implementable using UCM system 100 and other UCM systems, is flow charted in FIG. 3. At 301, vapor-phase source particles are generated from non-vapor-phase source material within a source cell nested within a hermetically-sealed vacuum enclosure. Using a vacuum established between the vacuum enclosure and the source cell, thermally isolating, at 302, an ultra-cold region within the vacuum enclosure and external to the resource cell from heat generated within the source cell in the process of generating the vapor-phase particles. At 303, using getter material, regulating the pressure of the source materials in the source cell. The getter material regulates pressure by sorbing and releasing source particles.

Using a laser, pre-cooling, at 304, vapor-phase source particles within the source cell. For example, a two-dimensional MOT can be used to pre-cool the source particles. At 305, pre-cooled source particles are transferred to an ultra-cold region within the vacuum enclosure and external to the source cell. This transferring can involve filtering out thermal and off-axis particles so that primarily collimated pre-cooled particles are allowed to pass to the ultra-cold region. At 306, using a laser, trapping the source particles in the ultra-cold region. For example, a three-dimensional MOT or optical molasses can be used to trap the source particles.

Figure 4:
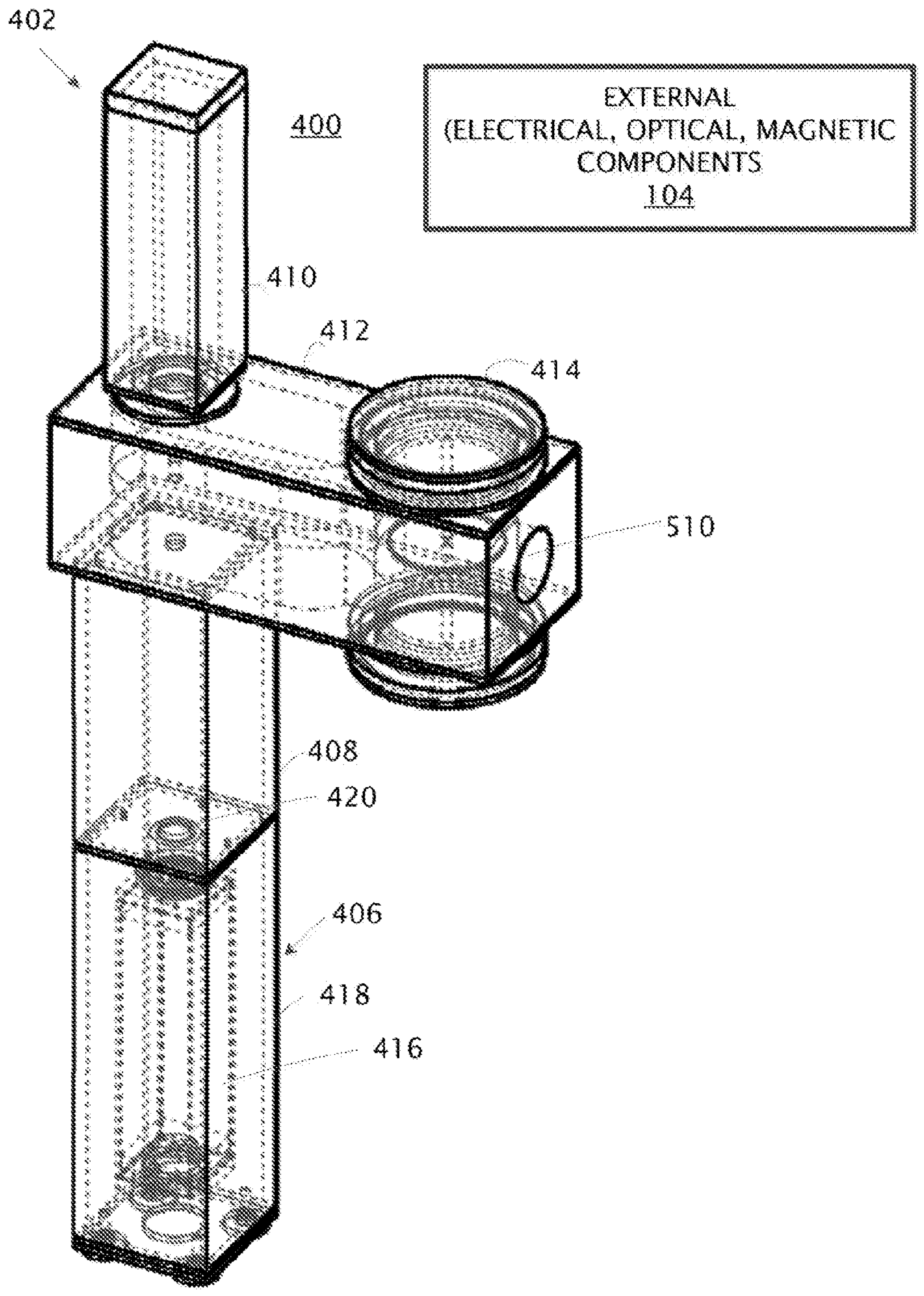
FIG. 4 is a schematic perspective view of a UCM system with discrete sections in accordance with the invention.
Figure 5:
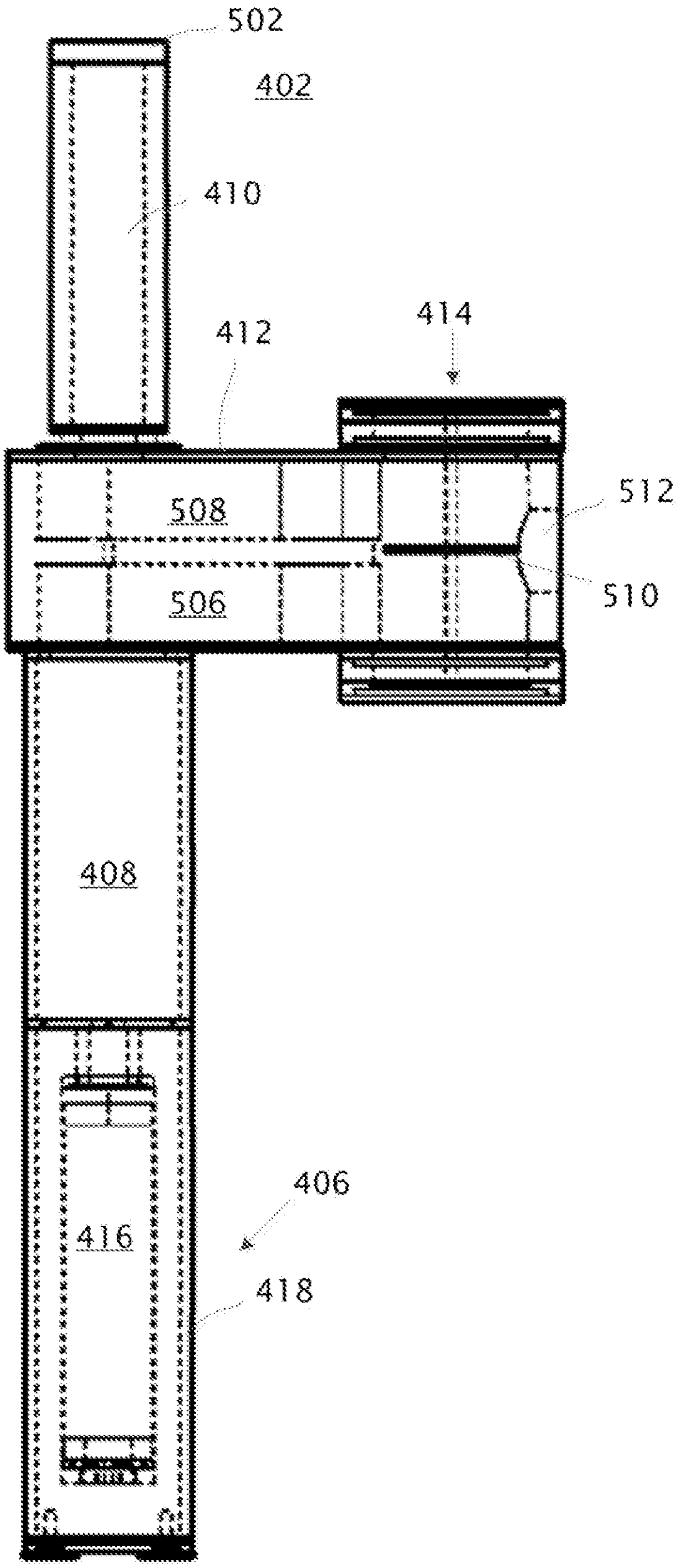
FIG. 5 is a schematic side view of a UHV system of the UCM system of FIG. 4.

The invention further provides for a UCM system 400, shown in FIG. 4, including a vacuum-cell assembly 402 and external electrical, optical, and magnetic components 404. As shown in FIGS. 4 and 5, vacuum-cell assembly 402 includes a nested source-cell assembly 406, an intermediate cell 408, a science cell 410, a manifold 412, and an ion pump 414. Nested source cell 406 includes a source cell 416 nested within an outer enclosure 418. Vapor-phase source atoms can exit source cell 416 via an aperture 420.

As best seen in FIG. 5, an atom chip 502 can serve as an end face for science cell 410. Science cell 410 can include optical components for a three-dimensional MOT. Science cell 410 can also include getter material to adsorb thermal atoms that manage to reach science cell 410.

Manifold 412 includes a barrier 504 between high vacuum (HV) and UHV vacuum regions 506 and 508, respectively, to establish differential pumping. Ion pump 414 includes an intermediate cathode 510 which separates HV and UHV vacuum regions within ion pump 414. Ion pump 414 provides a pump-out aperture 512 for pumping out vacuum-cell assembly 402 during initial setup and during maintenance cycles. Manifold 408 provides a fluidic conductance path 514 between science cell 410 and a UHV region 508. Manifold 412 provides a fluidic conductance path between source cell 416 and HV region 506 of ion-pump 414. In some embodiments, getters of thermal getter material are disposed within a manifold 412 to capture thermal atoms and alleviate the load on the ion-pump assembly. In an alternative embodiment, thermal getter material obviates the need for an ion pump.

Figure 6:
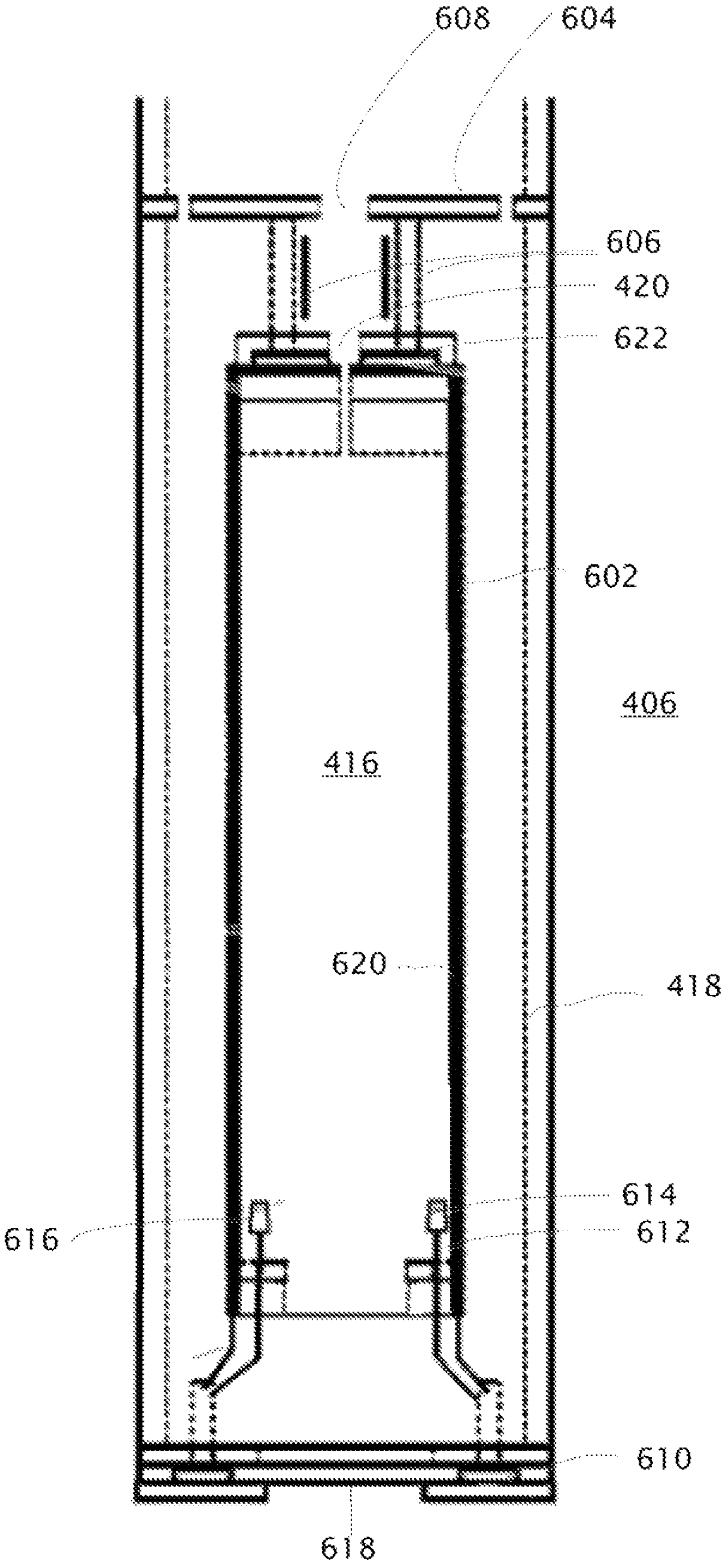
FIG. 6 is a schematic side view of a nested source-cell assembly of the UHV system of FIG. 5.

As best seen in FIG. 6, source cell 416 has an inner enclosure 602. Outer enclosure 418 has an end face 604 from which supports 606 extend to suspend source cell 416. An aperture 608 in end face 604 provides for fluidic communication between source cell 416 and the rest of vacuum-cell assembly 402 (FIG. 4). Source-cell assembly 406 provides large conductance channels 610 to allow efficient pumping of a vacuum region between inner enclosure 602 and outer enclosure 418.

Source-cell assembly 406 includes power feedthrough plates 610. In an alternative embodiment, bottom faces of the outer enclosure and the inner enclosure are combined to reduce feedthrough complexity. In-vacuum electrical connections 612 to a source ampule 614 and a getter ampule 616 are provided within source cell 416. Depending on the variation, getter ampule 616 can include cold-atom getter material, evaporable getter material, or non-evaporable getter (NEG) material.

Figure 8:
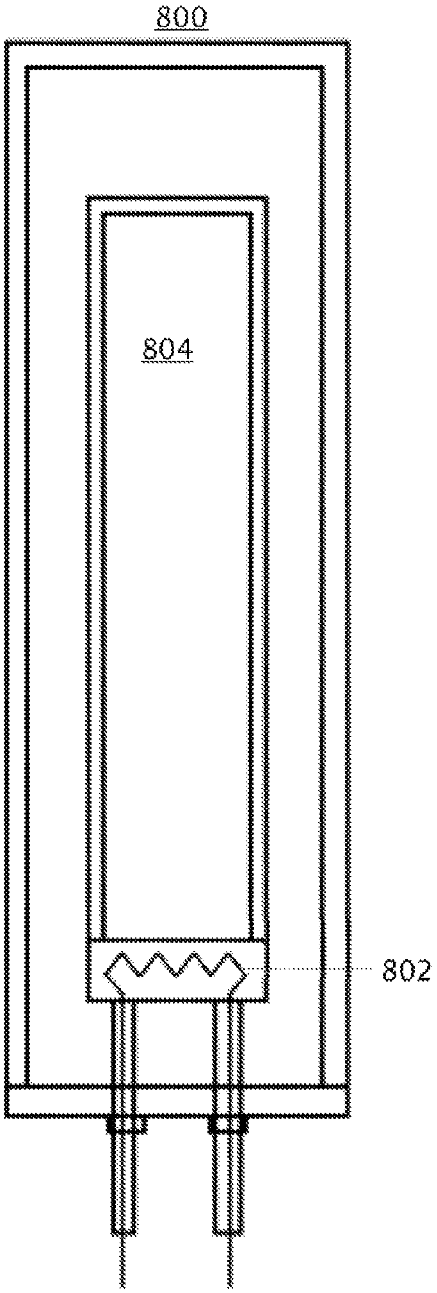
FIG. 8 is a schematic side view of an alternative source-cell assembly in accordance with an embodiment of the invention.
Figure 7:
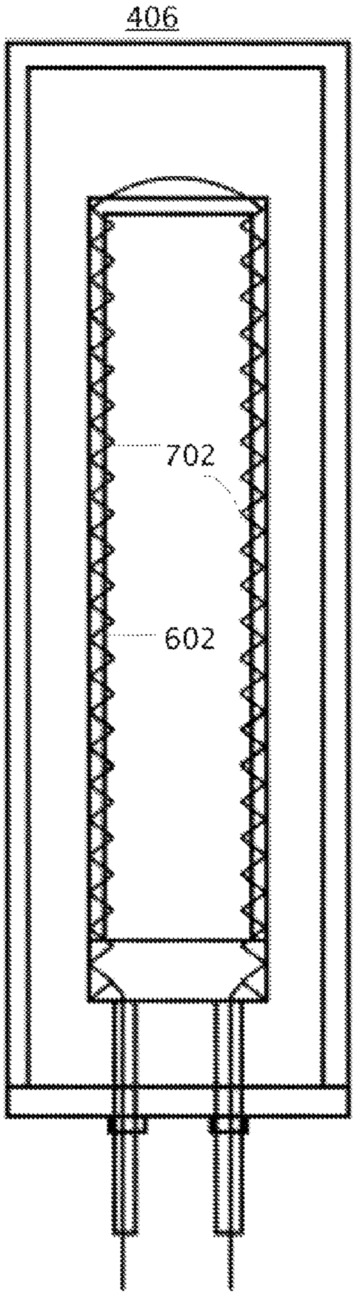
FIG. 7 is a schematic side view of the nested source-cell assembly of FIG. 6 showing a heater.

Components within source cell 416 are arranged to provide a clear optical aperture 618 on-axis with fluid-conductance apertures 420 and 608 to allow optical push beams to push source atoms directly (i.e., without requiring a reflector to reflect a laser beam to an in-plane path) toward and through fluid-conductance apertures 420 and 608. As shown in FIG. 7, heater elements 702 are formed on inner surfaces of inner enclosure 602 to prevent condensation of atoms on optical faces. Alternatively, in a source-cell assembly 800, shown in FIG. 8, a heater element 802 can be arranged along the base of a source cell 804. Electrical connections 612 are provided between feedthrough and heater elements 620, as shown in FIG. 6.

Standoffs 606 suspending source cell 416 have minimal thermal cross section to insulate source cell 416 from outer enclosure 418. Capture features 622 lock source cell 416 to standoffs 606, while allowing room or deflection for differential expansion of materials with dissimilar CTEs, e.g., sapphire of the inner enclosure 602 and sodium borosilicate glass for standoffs 606. Flared features in standoffs 606 enable capture features 622 to lock source cell 416 to outer enclosure 418. In alternative embodiments, flares are formed on the source cell; other embodiments use structured features other than flares to enable locking of a source cell to an outer enclosure.

Figure 9:
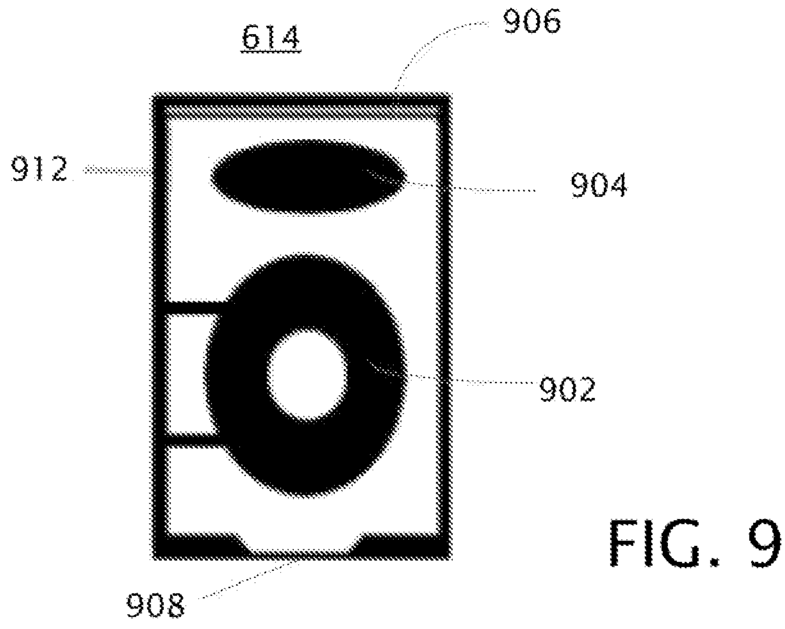
FIG. 9 is a schematic side view of a source ampule of the UCM system of FIG. 5

As shown in FIG. 9, source ampule 614 contains an alkali/alkaline-earth or other atom pressure regulator 902. Source ampule 614 contains source material 904 that can be in solid or liquid form. Alternatively, source atoms may be sorbed to pressure regulator 902. Source ampule 614 has an in-vacuum direct melt or anodic bonded crystalline or metal seal 906 such as silicon or tungsten plate. On the opposite (bottom) end is a "break" seal 908, e.g., a membrane designed to be broken or debonded after installation into a vacuum system to enable effusion of source particles from the ampule to the surrounding source-cell interior. Break seal 908 can be formed of glass, crystalline material such as silicon, germanium, and oxides of silicon or metals. Source ampule 614 includes standoffs 910 to thermally isolate pressure regulator 902 from inner enclosure 602 (FIG. 6) to allow optical heating of regulator 902 while minimizing heat transfer to inner enclosure 602.

Figure 10:
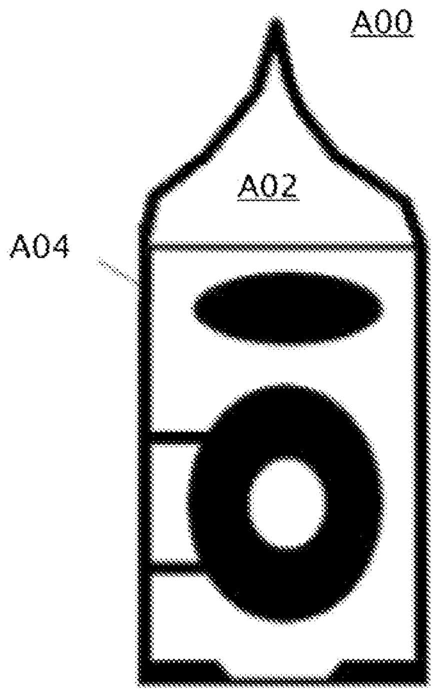
FIG. 10 is a schematic side view of an alternative source ampule for the UCM system of FIG. 5.

A source-ampule enclosure 912 can be formed of tubing or machined plates, out of materials such as sodium borosilicate for anodic and direct bonding to silicon and its oxides and nitrides. Alternatively, a source-ampule enclosure can be formed of aluminosilicate glass to minimize helium diffusion into the contents during storage. For example, aluminosilicate glass can be used for installation into a system requiring low helium loads due to low power or non-existent ion pumps. Getter ampule 616, FIG. 6, is similar to source ampule 614. An alternative source ampule A00 is shown in FIG. 10 having a glass tipoff or melt-bonded in-vacuum sealed element or nipple A02; source ampule A00 is similar to source ampule 614 in the materials for its wall A04 and in other respects.

Figure 11:
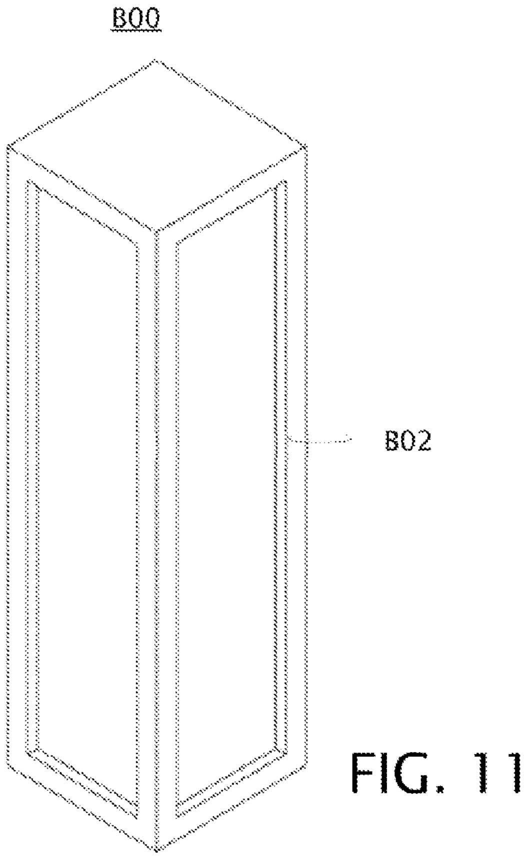
FIG. 11 is a schematic perspective view of a source cell with scaffolding in accordance with the invention.
Figure 12:
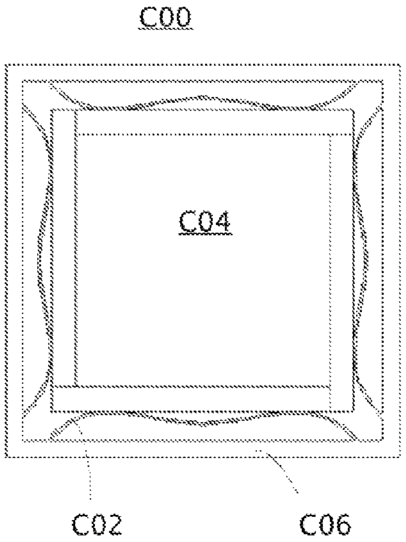
FIG. 12 is a schematic bottom view of a nested source-cell assembly in which springs are used as standoffs and for holding source-cell walls in position.

The walls of inner enclosure 602 are anodically bonded to form a robust bond without an adhesive. However, if, for example, sapphire is used for source-cell walls due to its resistance to corrosion, anodic bonding can be unavailable or problematic, e.g., due to CTE mismatches. Accordingly, for source cell B00, shown in FIG. 11, a scaffold B02 is mounted along seams between the walls to hold the walls together and to capture any materials leaking through the seams. Alternatively, as shown for source-cell assembly C00 in FIG. 12, springs C02 can be used to hold source-cell walls in position and to spatially and thermally isolate a source cell C04 from an outer enclosure C06. In an alternative embodiment, wires are wrapped about a source cell to hold the walls in position.

Figure 13:
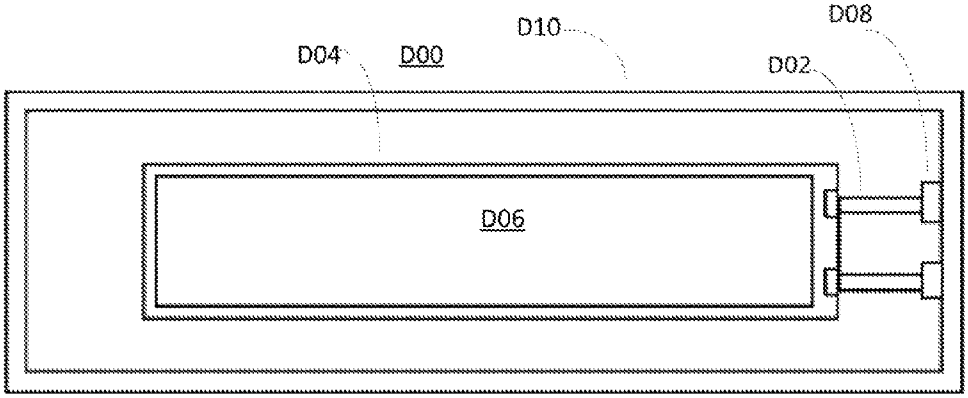
FIG. 13 is a schematic illustration of a nested source-cell assembly showing a particular configuration of standoffs.

In source-cell assembly D00, shown in FIG. 13, standoffs D02 are held in slots or counter bores in an inner enclosure D04 of a source cell D06. Standoffs D02 are also held by rings D08 rounded on an inner surface of an outer (vacuum) enclosure D10. Some tolerance is provided in the mounting to accommodate differential thermal expansion of the inner enclosure relative to the outer enclosure.

Figure 14:
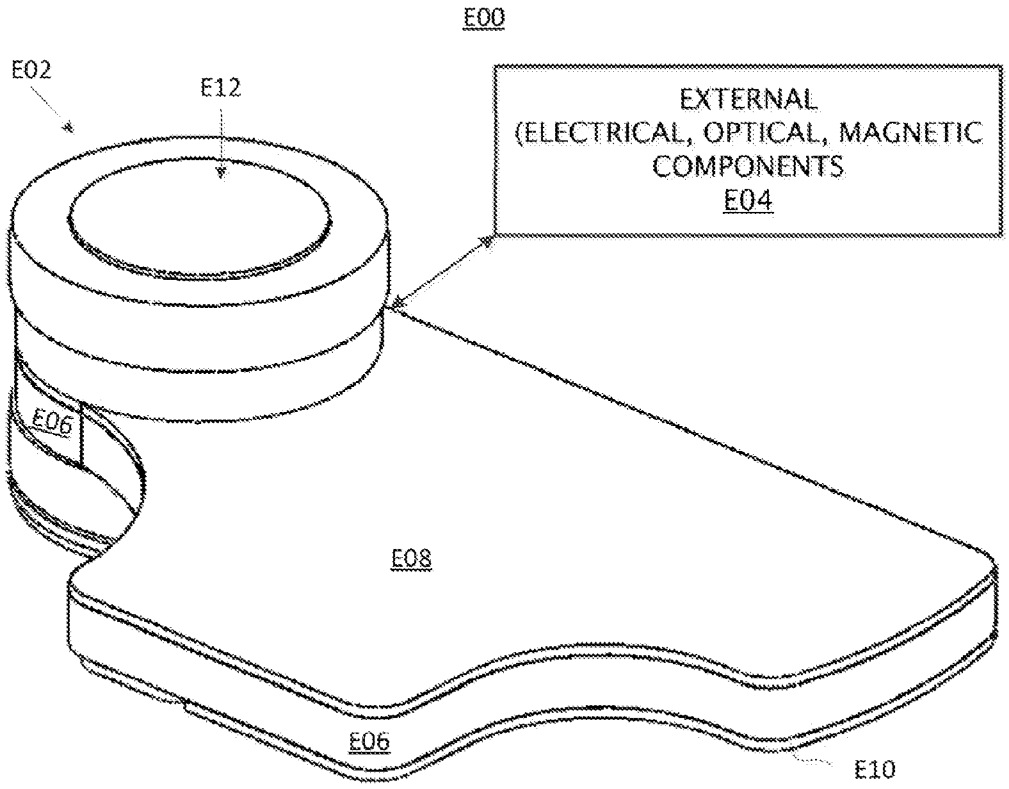
FIG. 14 is a perspective view of an integrated UCM assembly in accordance with the invention.

FIG. 14 is a schematic view of a UCM system E00 including a UHV system E02 and external components E04. UHV system E02 is an integrated system in that it has monolithic body E06. A top cover E08 and a bottom cover E10 seal body E06 on both sides. An ion-pump assembly E12 is mounted on and through body E06. Body E06 can be formed from a block of silicon, while top and bottom covers can be formed of aluminosilicate glass or other transparent glass or ceramic or crystalline material.

Figure 15:
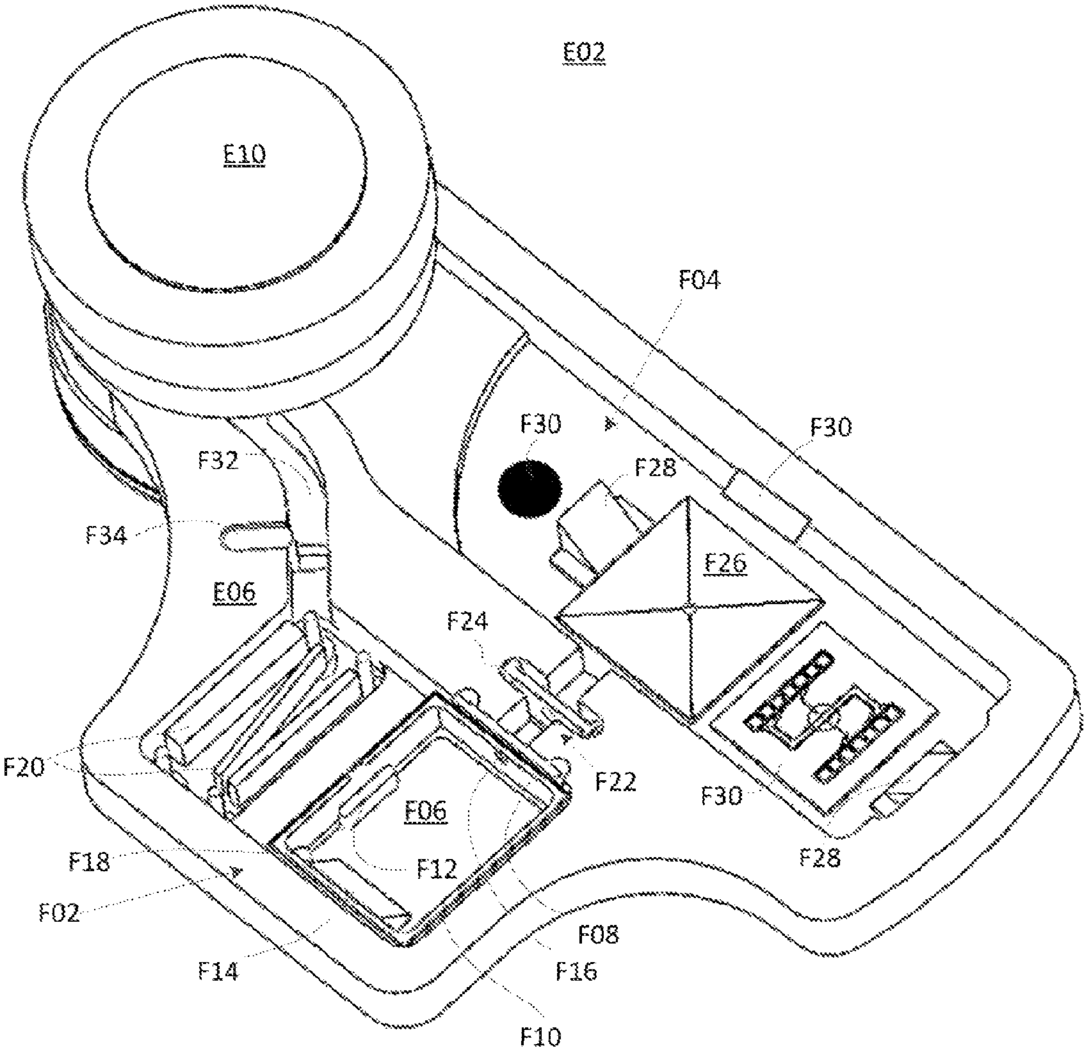
FIG. 15 is a perspective view of the integrated UCM system of FIG. 7 with the top cover removed.

As shown in FIG. 15, a source chamber F02 and a cold chamber F04 are formed in monolithic silicon body E06 by removing silicon from the original silicon block. Nested within source chamber F02 is a source cell F06. A rightward (in FIG. 8A) face F08 of source cell F06 is bonded, affixed, or aligned to an inner wall of source chamber F02. Five remaining faces F10 are spatially and thermally isolated from the silicon of body E06. Accordingly, heat conduction to body E06 is substantially prevented over 90% of the outer surface area of source cell F06. Further resistance to heat loss is achieved by forming hot mirrors on exterior surfaces of source cell F06.

Source cell F06 contains liquid or solid source material F12, e.g., a reservoir of strontium that, when heated, is to yield strontium atoms in vapor phase. Source cell F06 contains a reflector F14 for reflecting a laser beam (generally to the right and up in FIG. 15) toward an exit aperture F16 of source cell F06. In addition, source cell F06 contains a vapor-pressure regulator F18 in the form of a reservoir of getter material for the source material, e.g., antimony, gold, and/or carbon for getting strontium. Depending on whether the amount of strontium adsorbed to the getter material is above or below an equilibrium level, the regulator will sorb more than it releases or release more than it sorbs. In this way, the regulator F18 regulates, in other words, buffers, the concentration of source atoms in source cell F06. The equilibrium point of regulator F18 can be raised by heating it with a laser, e.g., a commercially available laser pointer. Thus, the amount of vapor-phase strontium in source cell F06 can be controlled by turning the laser on and off or adjusting its intensity.

Source chamber F02 contains getter structures F20 of getter material outside source cell F06. These additional getter structures F20 are to sorb any strontium that manages to escape from source cell F06 into the rest of source chamber F02.

Reflector F14 reflects a laser beam that enters source cell F06 orthogonal to top cover E08 (FIG. 14). This beam is reflected toward exit aperture F16 so that it pushes some strontium atoms towards and through exit aperture F16. Reflections from around exit aperture F16 serve to slow and pre-cool atoms on their way to exit aperture F16. As a result, most of the atoms that exit source cell F06 are cooled. In an alternative embodiment, a source cell includes additional reflectors defining a two-dimensional magneto-optical trap to help pre-cool the atoms and to help confine the pre-cooled atoms to a path aligned with the exit aperture.

Atoms exiting source cell F06 via exit aperture F16 enter a collimating filter F22 defining a particle conductance path segment to cold chamber F04. Walls of the particle conductance path segment are coated with getter material to trap thermal and off-axis atoms to prevent them from reaching cold chamber F04. Collimating filter F22 includes a shutter or suspended getter aperture F24 that restricts the conductance passage to improve the gettering effectiveness of the getter material F24 assist the pressure gradient between chambers.

Cold chamber F04 contains a diffraction grating F26 to enable compact beam-shaping and beam-steering for capture or interaction with cooled atoms. Reflectors F28 reflect orthogonally incident laser beams in-plane to control motion of cold atoms transverse to the atom beam emerging from the collimating filter F22. Reflectors F28 enable improved access to atom chip optical transport and interrogation. Getters F30 adsorb thermal atoms as well as non-captured cooled atoms from chamber F06 so that they do not interfere with control of the cold atoms. An atom chip F32 provides electrical and magnetic access to cold atoms, e.g., for forming a Bose-Einstein condensate. The cold-atom chip is mounted on an optical window surface.

Ion pump E10 removes thermal source atoms and any contaminants to maintain a sufficient UHV. To this end, ion pump E10 is fluidically coupled to cold chamber F04. Vacuum system E02 also provides a fluidic passage F32 between ion pump 31 and source chamber F02 for use in pumping out source chamber F02 initially and during maintenance operation. A shutter F34 closes this passage during normal operation of vacuum system E02 to allow pressure buildup of vapor-phase source particles and prevent backflow of atoms into UHV chamber F04 through the ion pump chamber.

Conventional cold-atom systems, typically require loading of the molecular species, e.g., atomic species, of interest from a thermal background pressure. Capture rate often depends on higher pressures of the species of interest, but lifetime and sensitivity of the measurements performed on or with the species is conversely limited by high background pressures. In addition, some atomic species may require temperatures in the hundreds of degrees centigrade to have sufficient background pressure for desired loading rates; these elevated temperatures introduce a plethora of design challenges.

Such challenges include thermal power to maintain oven temperature or vapor pressure, material expansion mismatches between bonded materials, material stress due to thermal gradients, gas permeation rates at elevated temperatures, and material chemical resistance to the thermal vapor. One solution is to use a chamber made of steel and conventional glasses such as sodium borosilicate glass or aluminosilicates. However, these are often large, expensive, and power hungry. Miniaturization may include a chamber made entirely of strontium resistant materials such high-alumina glass, sapphire and to a lesser extent titanium. While pure aluminum oxide materials may be one of the most chemically resistant choices, hermetic assembly of an all or mostly sapphire system in a manner that is corrosion resistant at the seams and can be sealed after vacuum processing without compromising some component of the cell is challenging. Furthermore, even an all sapphire or comparable corrosion resistant cell assembled by direct bonding, if heated to maintain sufficient strontium pressures for high atom loading, can require a large thermal load to maintain temperature.

At present the majority of solutions involve making small vacuum systems that have poor pressure ($10^{-8}$ Torr or worse) to maintain capture rates, or large vacuum systems to achieve vacuum isolation and sufficiently cool the vapor, captured or otherwise, before use. The present invention allows for substantial size reduction in vacuum systems, while achieving excellent vacuum pressure and thermal isolation thereby reducing power requirements.

The primary challenges to a system that uses corrosive aggressive molecular species such as strontium are thermal, vacuum isolation, and vapor cooling for precision measurements. The first challenge with a species such as strontium in a vacuum chamber is getting vapor of the desired species and then capturing or utilizing it in a way that is advantageous over more conventional technologies. Atomic vapors are often introduced in vacuum chambers with initial pressures from $10^{-5}$ to $10^{-13}$ torr to reduce atomic interactions that may disturb the measurements being performed on the species of interest. Typically UHV is achieved by cleaning the system of contaminants, and then the species is introduced as a thermal vapor whereby the temperature of a reservoir or sample of the species is controlled to achieve a vapor pressure that puts the desired concentration of atoms into the vacuum as a gas. Alternatively, some species are not practical to store and assemble into vacuum chambers while in their pure form and so are stored in chemically bonded sources such as salts, alloys, or eutectics and then heated to liberate the desired species from its bonds. In either event, many of these processes require elevated temperatures, often between 0° C. and 1000° C.

The desired pressure is dictated by the experiment being done or the method of capture. Some species may have sufficient vapor pressure at 0° C. to require no heating or actual cooling. Others may require 500° C., which means considerable energy must be pumped into the heater element or atomic oven to maintain pressure. However, if the walls of the chamber are cold, their temperature will dominate the vapor pressure since as soon as a molecule of the species impacts the wall it will cool and most likely condense requiring the oven be run even hotter to introduce more of the species at a rate that can be captured efficiently. For this reason, capture chambers, such as an optical trap region, are held at an elevated temperature at or near the oven temperature to not only maintain vapor pressure for trapping rates, but also to prevent condensation on the optical faces that would otherwise reduce the optical intensity and beam quality of the optical beams transmitting through the vacuum chamber walls or windows to form the trap.

Furthermore, materials such as fused silica, sodium borosilicate glass, is steel, and others are attacked at different rates when held at high temperatures and exposed to some of these hot elements. If allowed to continue, the corrosion may eventually compromise the vacuum chamber causing a leak or degradation of the surface finish and, therefore, it can affect the optical beam quality for beams transmitted through the windows to interact with the contained species. Therefore, a desired solution is to utilize materials that are chemically resistant or inert to the hot vapor species, and that are optically transmissive to the wavelengths needed to capture, interrogate, and manipulate said species. Such materials may include sapphire or high-alumina content glasses.

However, assembling hermetic-vacuum chambers out of these materials may be impractical. For example, sapphire, while it may be readily direct bonded to more sapphire, is not compatible with many materials for practical fabrication of vacuum chambers, often due to thermal expansion mismatches or chemical compatibility for bonding. Therefore, the inability to transition to another chamber makes electrical feedthroughs, and even initial vacuum processing, impractical due to thermal or hermetic reliability and expense. While intermediate materials such as metals or frits (an intermediate glass that acts as a glue) or even glues may seem a great fabrication method to bond sapphire, many metals and frits are susceptible to attack by the hot vapor species, which attack will eventually compromise vacuum integrity.

Systems disclosed herein make use of a "hot vapor source cell" made of a chemically resistant material, such as sapphire by frits, contact bonding, or even mechanically held in place with very close tolerance mating parts. These cells need not be hermetic since they are then inserted into a cell that is hermetic, but are suspended in this cell with a minimum of physical or thermal contact. The cell-within-a-cell, i.e., nested cell, can be or contain the source of the hot species, such as an oven heated by electrical, RF, or radiation source. The nested cell can be heated to hundreds of degrees centigrade. In such a configuration, the two primary methods of heat loss are black body and direct thermal contact through the minimal supports suspending the cell.

Black body radiation can be mitigated by polishing every surface of the inner cell, by mechanical, chemical, or fire polishing. Materials of lower emissivity can be deposited over materials of higher emissivity, and themselves, can be polished to further reduce black body losses. Thermally reflective coatings, often called "hot mirrors", can be deposited on the outer wall of the sapphire or inner wall of the containing enclosure to reflect the majority of infrared blackbody radiation back into the inner cell while also allowing optical beams for an optical trap, as an example, to transmit through the entire assembly with minimal power loss.

Direct thermal losses can be mitigated by using support materials with low-thermal conductivity and low cross-sectional areas or long lengths. For example, rods of a ceramic or glass to act as standoff mounts, or even suspension wires of a thin gauge metal or glass can provide excellent thermal isolation. By implementing these methods of isolation and heat reclamation, the inner cell can easily be held hundreds and even thousands of degrees centigrade above the temperature of the outer cell and require a minimum of power to achieve and maintain the elevated temperatures.

Heating of the inner cell can be accomplished by a few methods. One is direct radiation such as from filaments in an incandescent bulb, to radiatively heat the chamber. If a hot mirror is deposited on the inside of the outer chamber, then most of the energy will be collected by the inner cell, especially if its surface has been modified or coated to improve absorption. However, if there is good thermal isolation between inner and outer cell and surface modification, it may be unnecessary and in fact one may focus more on minimizing emissivity to increase the maximum temperature the inner cell will equilibrate to.

Heating may also be accomplished by running current directly through materials of the inner cell, if electrically conductive, or by attaching/depositing heater elements on the surface of the inner cell. In this way, less power is required in the heaters as they more efficiently heat the inner cell via direct contact. Such heaters may be in the form of thin strips of metal, such as silicon or of conductive ceramic, bonded to inner walls of the source cell. Alternatively, such materials may be deposited via a sputter, evaporation, or electroplating technique. One of the simplest ways to apply such heaters is to airbrush them or use spray coatings. Such sprayed coatings can be of a compound that adheres to the glass, is UHV compatible, and has sufficient electrical resistance in the practical thicknesses applied. In this case particles or colloids of metals such as silver, gold, copper, etc., or their precursors mixed with binders such as sodium silicate or similar solutions including silica, alumina, and other similar materials can provide just such a robust heater element. If necessary, depending on materials such as sapphire and titanium, thermal diffusion, or compressive bonding, anodic bonding or other such schemes may be used to improve adhesion of the heater elements for high temperature operation to prevent delamination or failure.

In some cases, a thermal gradient is required on the inner cell say to keep condensation off of certain optical windows or mirrors, or to just control vapor pressure in regions of a chamber. This can be achieved using shaped, tapered or varying thickness heater elements that generate more heat in some regions than others, to help control the temperature gradient profile along the cell. Elements along the edge of a cell can be serpentine, zigzag, tapered, or any variety of shapes that are designed to carefully control where and to what degree resistive heating occurs. Alternatively, a higher emissivity material or surface finish may be deposited on one end of the cell or along its length to increase local radiative cooling to achieve a thermal gradient.

Alternatively, transparent conductors such as graphene or indium-tin-oxide (ITO) may be used, depending on chemical and thermal compatibility. Such coatings may be applied over the entire surface of the cell more uniformly distributing heat to the optical windows to reduce condensation, and to reduce the required power generated to maintain temperature. Patterning of such materials may also allow for subtle electric or magnetic field manipulations to the species contained within, or to other elements of interest mounted within the vacuum chamber.

With the inner cell held at high temperature, a high temperature vapor can be maintained within its walls, and whether the walls are held together by a frit, adhesive, direct bonding, or mechanical clamps and wire ties, minimal vapor loss can be achieved by having closely conformal mating faces with cooler masks or angled brackets covering the seams to condense and capture the leaking thermal species. Then the primary vapor loss is designed to be through a single small aperture in line with the next chamber. By this geometry, a hot conical spray to the next chamber can be mitigated by yet another geometry trap or long tube which exists at a cooler temperature encouraging condensation subsequently lowering the vapor pressure after the aperture. In fact, even if adhesives or frits are used, as long as they can achieve the vacuum levels required and are susceptible to attack by the hot species, they may lose hermetic sealing but maintain structural support, and thus are fine to hold together a nested cell.

Another method of fabrication to improve robustness is to direct bond chemically robust, optically transparent materials to form the cell. This can involve processing, such as polishing or melting mating surfaces to be conformal. Such conformity is typically within a few tens of nanometers. The parts are then pressed into contact with sufficient pressure or temperature to force a direct bond, followed by an anneal cycle. Even with flawed bonds that would not hold vacuum, the amount of strontium that could make its way through a partially bonded joint is negligible due to the poor molecular conductance. The cell, partially or fully assembled by direct bonding, requires only locating supports and has better thermal contact between cell parts making heating the cell uniformly more easy. Such a direct bond can also be formed with an intermediate material.

By this geometry, an optical trap or MOT (Magneto-Optical Trap) can capture, cool, and guide the species through the aperture without contacting it, thus suffering minimal loss in transport, and direct this cooler stream or pulse of the species into a chamber with better vacuum and orders of magnitude lower pressure of the background thermal gas to minimally impede the measurements and manipulations of the cooler species being transported. This is effectively a 2D-3D MOT configuration when used in a magneto-optical trap system. A heated window or reflective mirror at the end of the path the cooler atoms are transported along can be used to allow a cooling beam to propagate counter to the direction of the guided species, thereby, slowing or cooling it further from the aperture into the next chamber. In this way, the size and need for the Zeeman slower commonly used in some cells can be reduced or eliminated, thus further reducing the length and complexity of the cell. Where a mirror is used rather than a window, the mirror would not need to be heated as the collected species may just act as a mirror.

The captured and cooled atoms can then be used in a variety of ways such as for magnetometry, interferometry, gravimetry, more refined atomic clock sources, atomic references, navigation and more. Multiple cells may be attached, as well as multiple suspended cells. Geometries may vary but the fundamental principle is a thermally isolated and contained inner cell architecture that allows for high vapor pressure of corrosive or very high temperature species with minimal thermal power requirements.

The vacuum chamber itself can be fabricated out of conventional materials such as but not limited to sodium borosilicate glass, fused silica, steel, silicon, and more. These and other materials are much easier and economical to work, shape, fuse, vacuum process, and seal. While a variety of passive pumps, or getters, may be used to pump chemically active species, small active pumps can be integrated, and since they do not have to pump a high vapor pressure of the desired species, nor deal with elevated diffusion rates of gases from the outside due to elevated chamber temperatures, the passive pumps and active pumps can be smaller and require less power reducing system size and power requirements. This nested cell approach can work with channel cell technology, wherein small chambers such as tiny sapphire cells can be suspended into channel cells as a source or reference.

Another practical problem to contend with is assembly. While some species may be handleable, or in a form that is handleable in air during cell assembly, elevated temperatures required for some assembly steps may necessitate an inert atmosphere. In particular, strontium requires an inert gas like argon if it is present during assembly steps in atmosphere at elevated temperatures, as oxygen and nitrogen are prone to react with such species. Therefore, final assembly of such a system can include a step wherein a purged argon environment or a vacated environment is used during the as few as possible process steps requiring elevated temperatures.

Herein, "ultra-cold" refers to temperatures below 1 K. "Ultra-cold-matter" ("UCM") refers to matter at ultra-cold temperatures. This can include atoms that have been essentially stopped or are moving essentially exclusively under external control. In addition, "ultra-cold-matter" encompasses matter in states, e.g., a Bose-Einstein condensate, that are known to occur primarily or exclusively at ultra-cold temperatures. An "ultra-cold-matter system" is a system capable of causing matter to reach ultra-cold temperatures.

An "ultra-high vacuum" (UVH) is a vacuum with pressure below $10^9$ torr. A seal is "hermetic" if it prevents atoms from passing. "Transparent" refers to material that allows light to pass through without distortion. Unless otherwise specified, the light is visible light. However, if a laser of a particular wavelength or wavelength range is referenced, then the transparency is with respect to that wavelength or wavelength range. A "hot mirror" is a dielectric mirror, a dichroic filter, that reflects infrared light, while allowing visible light to pass.

Anodic bonding is a process for bonding glass to silicon or metal using heat and an electrostatic field to facilitate the movement of positive ions in the glass to the cathode material. Compressive bonding (aka, thermocompression bonding or diffusion bonding) is a process for bonding materials involving elevated temperatures and applied force. Herein, "sorb" encompasses "absorb" and "adsorb".

Herein, art labeled "prior art" is admitted prior art. Art not labeled "prior art" is not admitted prior art. The foregoing embodiments and variations upon and modifications to are within the scope of the present invention, the scope of which is defined by the following claims.

What is claimed is:

1. An ultra-cold-matter (UCM) system comprising:

a hermetically-sealed ultra-high-vacuum (UHV) enclosure;

a source cell having a source-cell enclosure, the source cell being nested within the UHV enclosure, the source cell being physically attached to and separated from the UHV enclosure so as to be thermally isolated from the UHV enclosure;

a source material in a non-vapor phase and disposed within the source cell, said source material being characterized in that vapor-phase source atoms can be released from the source material;

a cold-atom trap for cooling at least some of the vapor-phase source atoms to an ultra-cold temperature; and an atom getter for maintaining an ultra-high vacuum within the UHV enclosure at least in part by causing at least some of the vapor-phase source atoms to be sorbed to or into a getter material, the atom getter being disposed within the UHV enclosure and outside the source cell.

2. The UCM system of claim 1 further comprising a laser external to the UHV enclosure that serves as a source of a laser light, the UHV enclosure including a first transparent material that is transparent to the laser beam, the source-cell enclosure including second transparent material that is transparent to the laser beam and that is more resistant to corrosion by the vapor-phase source atoms than is the first transparent material.

3. The UCM system of claim 2 wherein the vapor-phase source atoms are atoms of strontium, the first transparent material is glass and the second transparent material is sapphire.

4. The UCM system of claim 1 wherein the getter material is disposed within the source cell and serves to regulate the amount of vapor-phase source atoms in the source cell by sorbing and releasing source atoms as a function of the partial pressure of the source atoms in the source cell.

5. The UCM system of claim 4 wherein the getter material includes at least one of gold, carbon, and antimony.

6. The UCM system of claim 1 further comprising:

a first light-reflecting element set of at least a first reflecting element within the source-cell enclosure arranged to support a two-dimensional atom trap;

a second light-reflecting element of at least a second reflecting element located within the enclosure and external to the source-cell enclosure and arranged to support a three-dimensional atom trap.

7. The UCM system of claim 1 wherein the atom getter includes an ion pump that ionizes the source atoms to yield source ions, the ion pump accelerating the source ions so that they contact that getter material.

8. The UCM system of claim 1 further comprising a hot mirror disposed between the source-cell enclosure and the UHV enclosure.

9. The UCM system of claim 8 wherein the hot mirror is formed as a coating on a surface of the source-cell enclosure facing the UHV enclosure.

10. The ultra-cold-matter system of claim 1 further comprising:

a heater element disposed within the source-cell interior; and electrical feed-throughs through the source cell and the UHV enclosure, the electrical feed-throughs providing electrical paths to and from the heater element.

11. The UCM system of claim 1 wherein the source material is an alkaline earth metal and the source cell is predominantly of sapphire or high-alumina-content silicate glass.

12. A process comprising:

generating a vapor phase of source particles at least in part by heating a non-vapor-phase material, the generating occurring within a source cell nested within a vacuum enclosure;

using a vacuum established between the vacuum enclosure and the source cell, thermally isolating an ultra-cold region within the vacuum enclosure and external to the source cell from heat generated in the source cell;

using a laser, pre-cooling source particles within the source cell;

transferring pre-cooled source particles from the source cell to the ultra-cold region; and using a laser, trapping the source particles in the ultra-cold region.

13. The process of claim 12 further comprising regulating a pressure of the source particles in the source cell using getter material in the source cell that sorbs and releases at least some of the source particles.

14. The process of claim 12 further wherein the thermally isolating includes reflecting infrared light exiting the source cell using a hot mirror.

15. The process of claim 12 further wherein the source cell is nested within the vacuum enclosure using standoffs to spatially and thermally isolate the source cell from the vacuum enclosure.

16. The process of claim 12 further wherein the transferring includes gettering off-axis particles between the source cell and the ultra-cold region.

* * * * *